United States Patent
Saldana et al.

[19]

[11] Patent Number: 6,121,600
[45] Date of Patent: Sep. 19, 2000

[54] INTEGRATED NIGHT VISION DEVICE AND LASER RANGE FINDER

[75] Inventors: Michael R. Saldana, New Braunfels; Rodney Lynn Doster, Garland, both of Tex.; Roland M. Morley, Tempe, Ariz.; Joseph Paul Estrera, Dallas, Tex.

[73] Assignee: Litton Systems, Inc., Woodland Hills, Calif.

[21] Appl. No.: 08/901,423

[22] Filed: Jul. 28, 1997

[51] Int. Cl.[7] ....................................... H01J 31/50
[52] U.S. Cl. ........................... 250/214 VT; 313/103 CM
[58] Field of Search ............. 250/214 VT; 313/103 CM, 313/105 CM; 356/5.01, 5.03, 5.05, 5.04

[56] References Cited

U.S. PATENT DOCUMENTS

| | | |
|---|---|---|
| 4,442,349 | 4/1984 | Blom et al. . |
| 4,935,616 | 6/1990 | Scott . |
| 5,035,472 | 7/1991 | Hansen . |
| 5,084,780 | 1/1992 | Phillips . |
| 5,146,077 | 9/1992 | Caserta et al. . |
| 5,198,657 | 3/1993 | Trost et al. ........................ 250/214 VT |
| 5,220,164 | 6/1993 | Lieber et al. ...................... 250/214 VT |
| 5,694,203 | 12/1997 | Ogawa .................................... 356/5.04 |
| 5,747,792 | 5/1998 | Kintz et al. . |

Primary Examiner—Stephone B. Allen
Attorney, Agent, or Firm—Marsteller & Associates, P.C.

[57] ABSTRACT

An integrated night vision device and laser range finder provides both night-time and day-time imaging by use of an image intensifier tube, as well as providing laser range finding operations both day and night. In a laser range finder mode of operation the device projects a pulse of laser light into a scene being viewed, and a power supply and laser range finder circuit of the device temporarily utilizes the image intensifier tube as a sensor to detect reflected laser light. During laser range finding, imaging is cut off for a very short time interval. Also, during imaging operations, the power supply and laser range finder circuit operates the image intensifier tube in a unique way in order to provide both improved automatic brightness control (ABC) and improved bright-source protection (BSP). The ABC and BSP functions are coordinated with the laser range finding function in order to prevent interference by the ABC or BSP functions with laser range finding operations.

23 Claims, 2 Drawing Sheets

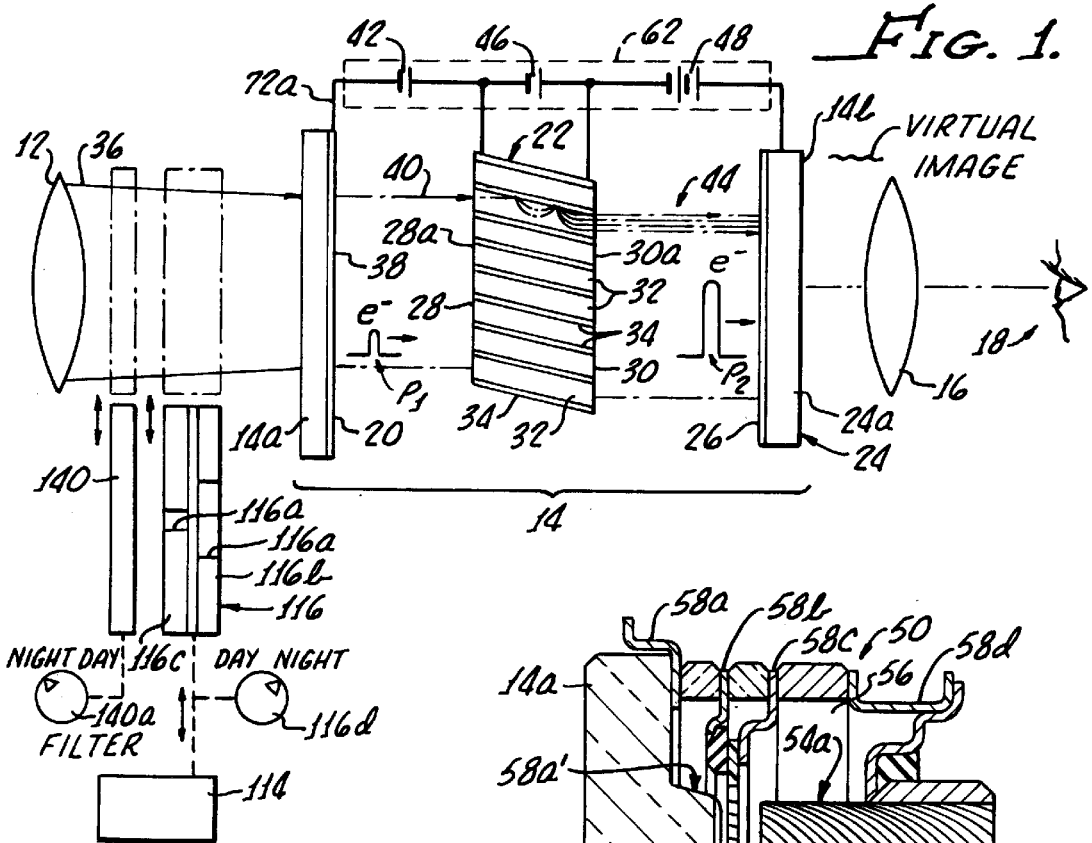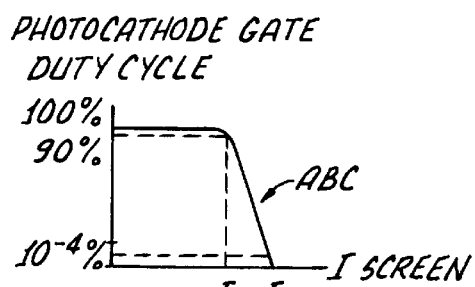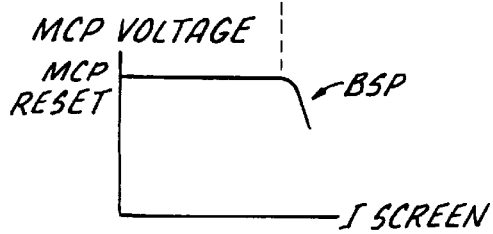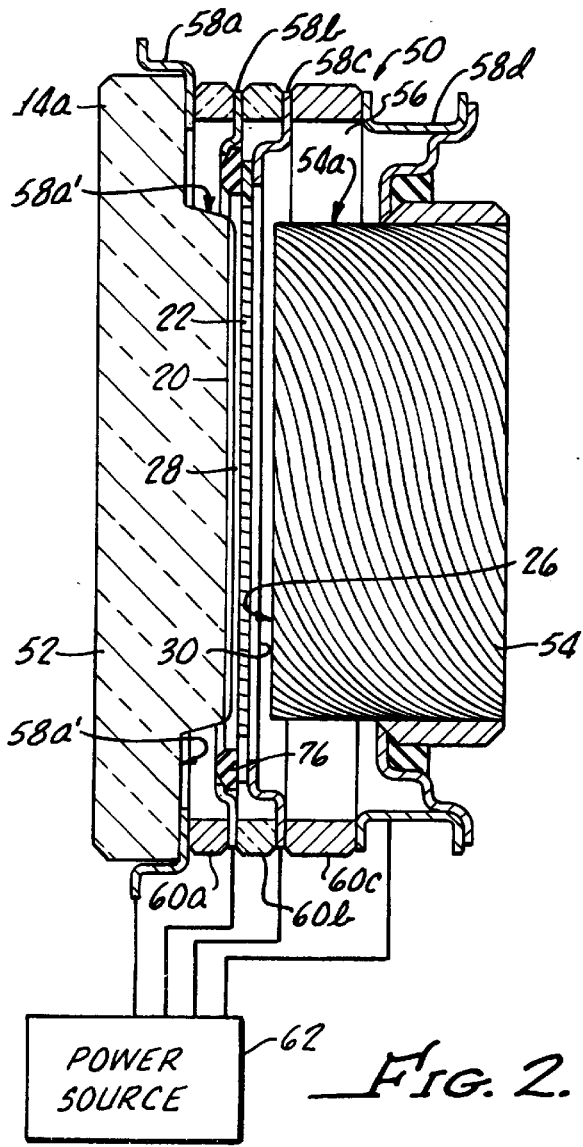

INTEGRATED NIGHT VISION DEVICE AND LASER RANGE FINDER

CROSS REFERENCE TO RELATED APPLICATION

The subject matter of this application is technically related to the subject matter of U.S. patent application Ser. No. 08/901,419, filed Jul. 28, 1997, which has the same inventor and is assigned to the same assignee as this application, and the disclosure of which is incorporated herein by reference to the extent necessary for a complete and enabling disclosure of the present invention.

FIELD OF THE INVENTION

The present invention is generally in the field of night vision devices of the light amplification type. More particularly, the present invention relates to an improved night vision device having an image intensifier tube ($I^2T$). Also, the present invention is in the field of laser range finders. A method of operating the device and a method of laser range finding (LRF) are disclosed also.

BACKGROUND OF THE INVENTION

Laser range finders have been known for a considerable time. These devices are used, for example, by surveyors to calculate the distance from a point of observation to an object such as a geological formation in the field of view. Generally, a laser range finder operates by projecting a pulse of laser light at an object. The laser light illuminates the object, and a portion of the laser light is reflected back toward the laser range finder device. The reflected laser light is detected, and the time interval required for the laser light pulse to travel to and from the object is measured. From this time interval measurement and the known speed of light, the distance between the laser range finder and the object is calculated.

Such a conventional laser range finder includes a laser capable of producing laser light pulses of high peak power and very short duration (i.e., less than 50 ns duration). The detector for the reflected laser light may include a high speed photodetector (such as an InGaAs avalanche photodiode), which is coupled to a high gain, high speed amplifier. A high speed digital counter is used as a timer to determine the time interval required for the laser light to travel to the object and for laser light reflecting off of the object to travel back to the device. From this time interval information an internal electronic calculator determines the range to the object, and this range is presented to the user of the device, usually on a visual display screen.

These conventional laser range finders have a disadvantage of a considerable cost and complexity. The laser pulses must be of considerable intensity as well, which requires a high power laser. The conventional laser range finders are subject to optical and electrical problems, such as vulnerability to electromagnetic interference, damage to electrical components and damage to optical components. Reliability of the devices is also adversely impacted by their complexity.

On the other hand, conventional night vision devices of the image intensification type (i.e., light amplification) type have also been known for a considerable time. Generally, these night vision devices include an objective lens which focuses invisible infrared light from the night time scene onto the transparent light-receiving face of an image intensifier tube. At its opposite image-face, the image intensifier tube provides an image in visible yellow-green phosphorescent light, which is then presented to a user of the device via an eye piece lens.

Even on a night which is too dark for diurnal vision, invisible infrared light is richly provided by the stars. Human vision can not utilize this infrared light from the stars because the so-called near-infrared portion of the spectrum is invisible for humans. A night vision device of the light amplification type can provide a visible image replicating the night time scene.

A contemporary night vision device will generally use an image intensifier tube with a photocathode behind the light-receiving face of the tube. The photocathode is responsive to photons of infrared light to liberate photoelectrons. These photoelectrons are moved by a prevailing electrostatic field to a microchannel plate (MCP) having a great multitude of dynodes, or microchannels with an interior surface substantially defined by a material having a high coefficient of secondary electron emissivity. The photoelectrons entering the microchannels cause a cascade of secondary emission electrons to move along the microchannels so that a spatial output pattern of electrons which replicates an input pattern, and at a considerably higher electron density than the input pattern results. This pattern of electrons is moved from the microchannel plate to a phosphorescent screen to produce a visible image. A power supply for the image intensifier tube provides the electrostatic field potentials referred to above, and also provides a field and current flow to the microchannel plate.

Conventional night vision devices (i.e., since the 1970's and to the present day) provide automatic brightness control (ABC), and bright-source protection (BSP). The former function maintains the brightness of the image provided to the user substantially constant despite changes in the brightness (in infrared and the near-infrared portion of the spectrum) of the scene being viewed. BSP prevents the image intensifier tube from being damaged by an excessively high current level in the event that a bright source, such as a flare or fire, comes into the field of view.

The ABC function is conventionally accomplished by providing a regulator circuit monitoring the output current from the phosphorescent screen. When this current exceeds a certain threshold, the field voltage level across the opposite faces of the microchannel plate is decreased to reduce its gain. In other words, for each photoelectron entering a channel of the microchannel plate, the number of secondary-emission electrons exiting this microchannel will be a function of the applied voltage differential across the microchannel plate (as well as the so-called "strip current" of this plate) within a certain range for the operation of the microchannel plate. Reducing the applied voltage differential across a microchannel plate decreases both the number of secondary-emission electrons produced and the strip current of the microchannel plate.

Unfortunately, this reduction in microchannel plate voltage also has the effect of reducing the resolution of the image intensifier tube. That is, the gain versus voltage function of the image intensifier tube at lowered voltages results in a matrix pattern from the microchannel plate appearing in the image. This matrix pattern is sometimes referred to as fixed-pattern noise in the image. As a result, in bright-field conditions with the ABC feature of the conventional night vision device operating the conventional night vision device may drastically lose resolution so that the user of the device is no longer able to discern details of the viewed scene which would be discernable were they viewed under darker field conditions in which ABC function were not applying.

A bright-source protection is provided in conventional night vision devices by decreasing the electrostatic field voltage provided to the photocathode. A BSP function results because the high impedance of the photocathode in combination with a circuit element of high resistance value in series with the photocathode creates a greater voltage drop under the higher current conditions caused by a large number of photons incident on the photocathode when a bright source is present in the viewed field (i.e., with a resulting high number of photoelectrons being provided by the photocathode). The photoelectrons provided by the photocathode represent a current flow increasing in magnitude with increasing light levels in the viewed field, such that the impedance of the photocathode causes an inherent decrease in the voltage level effective at the photocathode to move these electrons to the microchannel plate.

This conventional method of BSP also has the disadvantage of decreasing resolution for the image intensifier tube. The reduced electrostatic field between the photocathode and the microchannel plate input when the BSP function is operational causes a reduced resolution for the tube. That is, photoelectrons liberated within the photocathode are not moved to the microchannel plate as effectively when the field voltage for the photocathode is reduced, and may not reach the microchannel plate at all. This is the case because photoelectrons within the photocathode must overcome a surface potential barrier in order to escape the photocathode and move to the microchannel plate. In order to be liberated into free space and be moved by the prevailing electrostatic field to the input of the microchannel plate, photoelectrons must have a certain effective energy level. As the voltage applied to the photocathode decreases, considered statistically, some photoelectrons will not be able to overcome this surface potential barrier and will not be liberated into free space. The image information represented by these photoelectrons trapped within the photocathode will be lost from the image provided to the user of the night vision device.

Conventional night vision devices which are usable to sight a weapon are found in U.S. Pat. Nos. 5,084,780; and 5,035,472. Neither of these patents is believed to suggest or disclose a night vision device which is combined with a laser range finder using the image intensifier tube of the night vision device as a detector for laser light in the laser range finder.

SUMMARY OF THE INVENTION

In view of the deficiencies of the conventional related technology, it would be desirable to provide a single device which provides both night vision imaging and laser range finding functions.

Additionally, it would be desirable to provide a laser range finder which uses an image intensifier tube as a detector for reflected laser light from an object.

Yet another advantage would be to provide such a device which allows both night-time and day-time imaging and laser range finding using the image intensifier tube of the imaging device as the detector for reflected laser light.

Still another advantage could be obtained by provision of such a device which allows both night-time and day-time imaging and laser range finding using the image intensifier tube of the imaging device as the detector for reflected laser light, and which provides improved automatic brightness control and improved bright-source protection functions while avoiding the decrease in photocathode and microchannel plate voltages which conventional night vision devices utilize for these ABC and BSP functions.

Accordingly it is an object for this invention to provide a method of laser range finding using an image intensifier tube as a detector for reflected laser light.

An advantage of the present combined night vision device and laser range finder is that a single device is provided of considerably less expense and of considerably improved durability in comparison to the conventional technology providing these functions in two separate devices. The laser pulses needed for laser range finding can be of lower power than those required by a conventional laser range finder. This further decreases the cost of the device because of the lower cost of a lower power laser, and the energy user of the device is also decreased.

Other objects, features, and advantages of the present invention will be apparent to those skilled in the art from a consideration of the following detailed description of a preferred exemplary embodiment thereof taken in conjunction with the associated figures which will first be described briefly.

BRIEF DESCRIPTION OF THE DRAWINGS

FIG. 1 is a schematic representation of an integrated night vision device and laser range finder embodying the present invention, and with a part of this device shown in alternative operative positions by use of solid and dashed lines;

FIG. 2 shows a typical image intensifier tube in longitudinal cross section;

FIGS. 4 and 5 respectively provide graphical illustrations of an automatic brightness control (ABC) function, and of a bright-source protection (BSP) function of the integrated night vision device and laser range finder embodying the present invention.

DETAILED DESCRIPTION OF AN EXEMPLARY PREFERRED EMBODIMENT OF THE INVENTION

Figure 3:
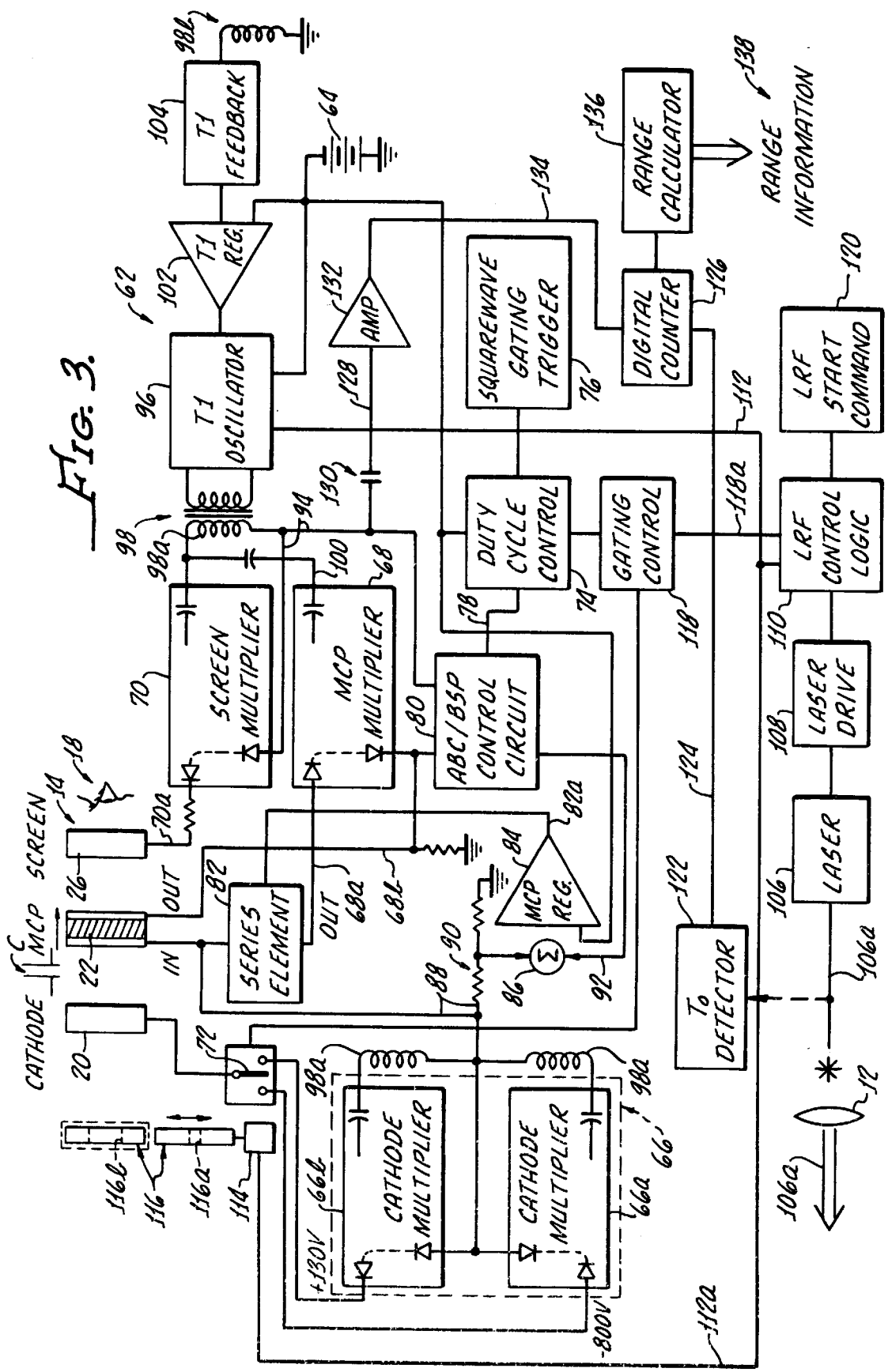
FIG. 3 is a schematic representation of a power supply and laser range finder operation circuit for an integrated night vision device and laser range finder embodying the present invention.

While the present invention may be embodied in many different forms, disclosed herein is a specific exemplary embodiment that illustrates and explains the principles of the invention. It should be emphasized that the present invention is not limited to the specific embodiment illustrated.
NIGHT VISION Referring first to FIG. 1, there is shown schematically the basic elements of one version of an integrated night vision device and laser range finder 10. Particulars of the laser range finding (LRF) operation of the device are presented below. In order to provide night vision, the device 10 generally comprises a forward objective optical lens assembly 12 (illustrated schematically as a single lens, although those ordinarily skilled will understand that the objective lens assembly 12 may include plural lens elements). This objective lens 12 performs at least two functions in the device 10, lens 12 focuses incoming light from a distant scene through the front light-receiving end 14a of an image intensifier tube 14 (as will be seen, this surface is defined by a transparent window portion of the tube—to be further described below). As was generally explained above in the discussion of the related technology, the image intensifier tube 14 provides an image at light output end 14b in phosphorescent yellow-green visible light. This image replicates the scene being viewed by use of the device 10.

The scene being viewed by use of device 10 may be a dark night-time scene which is invisible, or is only poorly visible, to the user of the device 10. On the other hand, as will be explained, the device 10 may be used to view a day-time scene, and to conduct laser range finding (LRF) in both daylight and at night. The visible image from tube 14 is presented by an eye piece lens illustrated schematically as a single lens 16 producing a virtual image of the rear light-output end 14b of the tube 14 at the user's eye 18.

More particularly, image intensifier tube 14 includes a photocathode 20 which is responsive to photons of light at the deep red end of the visible spectrum and in the near-infrared portion of the spectrum to liberate photoelectrons in a pattern replicating the scene being viewed, a microchannel plate (MCP) 22 which receives the photoelectrons in the pattern replicating the scene, and which provides a greatly amplified pattern of electrons also replicating this scene, and a display electrode assembly 24 having an aluminized phosphor coating or phosphor screen 26. A transparent window portion 24a of the assembly 24 conveys the image from screen 26 outwardly of the tube 14 so that it can be presented to the user 18.

Still more particularly, MCP 22 is located just behind photocathode 20, with the MCP 22 having an electron-receiving face 28 and an opposite electron-discharge face 30. This MCP 22 further contains a plurality of angulated microchannels 32 which open on an electron-receiving face 28 and on an opposite electron-discharge face 30. Microchannels 32 are separated by passage walls 34. At least a portion of the surfaces of the walls 34 bounding the microchannels 32 is formed by a material having a high coefficient of emissivity of secondary electrons. Thus, the channels 32 of the MCP 22 are each a dynode, emitting a shower of secondary electrons in response to receipt at face 28 of photoelectrons from photocathode 20.

The display electrode assembly 24, generally has a coated phosphor screen 26, and is located behind MCP 22 with phosphor screen 26 in electron line-of-sight communication with the electron-discharge face 30. This display electrode assembly 24 is typically formed of an aluminized phosphor screen 26 deposited on the vacuum-exposed surface of the optically transparent material of window portion 24a. The eye piece lens 16 is located behind the display electrode assembly 24 and allows an observer 18 to view a correctly oriented image corresponding to the low level image (i.e., dim or invisible, perhaps) of the scene being viewed.

As will be generally appreciated by those skilled in the art (now also viewing FIG. 2), the individual components of image intensifier tube 14 are all mounted and supported in a tube or chamber (to be further explained below) having forward and rear transparent plates cooperating to define a chamber (to be further defined below) which has been evacuated to a low pressure. This evacuation allows electrons liberated into the free space within the tube (i.e., the photoelectrons and secondary-emission electrons) to be transferred by prevailing electro static fields between the various components without atmospheric interference that could possibly decrease the signal-to-noise ratio.

As indicated above, photocathode 20 is mounted immediately behind objective lens 12 on the inner vacuum exposed surface of the window portion of the tube and before MCP 22. It is upon this photocathode that the objective lens 12 actually focuses the image of the distant scene, through the window portion which defines surface 14a. Typically, this photocathode 20 is a circular disk-like structure having a predetermined construction of semiconductor materials, and is mounted on a substrate in a well known manner. Suitable photocathode materials are generally semi-conductors such as gallium arsenide; or alkali metals, such as compounds of sodium, potassium, cesium, and antimony (commercially available as S-20). The photocathode is carried on a readily available substrate which is transparent to light in the wavelength band of interest (i.e., ordinarily in the deep-red and near infrared portion of the spectrum, extending in some cases to the blue portion of the visible spectrum—but which is not necessarily transparent to all visible light). A variety of glass and fiber optic substrate materials are commercially available.

Still referring to FIG. 2, and considering in somewhat greater detail the operation of the image intensifier tube 14 in its mode of operation providing a visible image it is seen that in response to photons 36 entering the forward end of night vision device 10 and passing through objective lens 12, photocathode 20 has an active surface 38 from which are emitted photoelectrons in numbers proportionate to and at locations replicative of the received light from the scene being viewed. In general, at night the image received by the device 10 will be too dim to be viewed with human natural vision, and may be entirely or partially of infrared radiation which is invisible to the human eye. The device may also operate in daylight to provide an image, as will be explained. It is thus to be understood that the shower of photoelectrons emitted from the photocathode are representative of the image entering the forward end of image intensifier tube 14. The path of a typical photoelectron emitted from the photon input point on the photocathode 20 is represented in FIG. 1 by dashed line 40.

Photoelectrons 40 emitted from photocathode 20 gain energy by passage through an applied electrostatic field between the photocathode 20 and the input face 28. The applied electric field is of a predetermined intensity gradient and is established between photocathode 20 and electron-receiving face 28 by a power source diagrammatically depicted in FIG. 1 and indicated by the numeral 42. Typically, power source 42 will apply an electrostatic field voltage on the order of 200 to 800 volts to maintain an electrostatic field of the desired intensity. This field is most negative at photocathode 20 and most positive at the face 28 of MCP 22. Further, an electrostatic field most negative at photocathode 20 and most positive at output electrode 24 is maintained in the image intensifier tube 14, as will be seen. After accelerating over a distance between the photocathode 20 and the input face 28 of the MCP 22, these photoelectrons 40 enter microchannels 32.

As will be discussed in greater detail below, the photoelectrons 40 are amplified by emission of secondary electrons in the microchannels 32 to produce a proportionately larger number of electrons upon passage through MCP 22. This amplified shower of secondary-emission electrons 44, also accelerated by a respective electrostatic field applied by power source 46, then exits from the microchannels 32 of MCP 22 at electron-discharge face 30.

Once in free space again (i.e., in the vacuum environment inside of tube 14), the amplified shower of photoelectrons and secondary emission electrons is again accelerated in an established electrostatic field provided by power source 48. This electrostatic field is established between the electron-discharge face 30 and display electrode assembly 24. Typically, the power source 48 produces a field on the order of 3,000 to 7,000 volts, and more preferably on the order of 6,000 volts in order to impart the desired energy to the multiplied electrons 44.

The shower of photoelectrons and secondary-emission electrons 44 (those ordinarily skilled in the art will know that considered statistically, the shower 44 is almost or entirely devoid of photoelectrons and is made up entirely or almost entirely of secondary emission electrons. This is the case because the statistical probability of a photoelectron avoiding absorption in the microchannels 32 is low). However, the shower 44 is several orders of magnitude more intense than the initial shower of photoelectrons 40, but is still in a pattern replicating the image focused on photocathode 20. This amplified shower of electrons falls on the phosphor screen 26 of display electrode assembly 24 to produce an image in visible light.

Viewing FIG. 2 in order to acquire a greater understanding of the detail of a typical image intensifier tube, the image intensifier tube 14 is seen to include a tubular body 50, which is closed at opposite ends by a front light-receiving window 52, and by a rear fiber-optic image output window 54. The window 54 defines the light output surface 14b for the tube 14, and carries the coating 26, as will be further described. As is illustrated in FIG. 2, the rear window 54 may be an image-inverting type (i.e., with optical fibers bonded together and rotated 180° between the opposite faces of this window 54 in order to provide an erect image to the user 18. The window member 54 is not necessarily of such inverting type. Both of the windows 52 and 54 are sealingly engaged with the body 50, so that an interior chamber 56 of the body 50 can be maintained at a vacuum relative to ambient. The tubular body 50 is made up of plural metal rings, each indicated with the general numeral 58 with an alphabetical suffix added thereto (i.e., 58a, 58b, 58c, and 58d) as is necessary to distinguish the individual rings from one another.

The tubular body sections 58 are spaced apart and are electrically insulated from one another by interposed insulator rings, each of which is indicated with the general numeral 60, again with an alphabetical suffix added thereto (i.e., 60a, 60b, and 60c). The sections 58 and insulators 60 are sealingly attached to one another. End sections 58 and 58d are likewise sealingly attached to the respective windows 52 and 54.

The body sections 58 are individually connected electrically to a power supply and laser range finder circuit 62 (which provides the power sources diagrammatically illustrated in FIG. 1 and indicated with reference numerals 42, 46, and 48, as described above), and which is effective during operation of the image intensifier tube 14 to maintain an electrostatic field most negative at the section 58 and most positive at the section 58d. As will be seen, the circuit 62 is also effective to control the operation of a laser to provide pulses of laser light, and to operate the image intensifier tube 14 as a detector for the reflected laser light in order to allow timing of the light pulses, and calculation of the range to a object illuminated by the laser light pulses.

Further viewing FIG. 2, it is seen that the front window 52 carries on its rear surface within the chamber 56 the photocathode 20. The section 58a is electrically continuous with the photocathode by use of a thin metallization (indicated with reference numeral 58a') extending between the section 58a and the photocathode 20. Thus, the photocathode by this electrical connection and because of its semi-conductive nature, has an electrostatic charge distributed across the areas of this disk-like photocathode structure. Also, a conductive coating or layer is provided at each of the opposite faces 28 and 30 of the MCP 22 (as is indicated by arrowed numerals 28a and 30a). Power supply 46 is conductive with these coatings by connection to housing sections 58b and 58c. Finally, the power supply 48 is conductive with a conductive layer or coating (possibly an aluminum metallization, as mentioned above) at the display electrode assembly 24 by use of a metallization also extending across the vacuum-exposed surfaces of the window member 54, as is indicated by arrowed numeral Considering now FIG. 3, it is seen that the circuit 62 includes a power source, which in this case is illustrated as a battery 64. It will be appreciated that a battery 64 is generally used as the power source for portable apparatus, such as night vision devices. However, the invention is not limited to any particular power source. For example, a regulated line-power source could be used to provide input power to a power supply implementing and embodying the principles of the present invention. Considered generally, the circuit 62 includes three voltage multipliers, respectively indicated with the numerals 66, 68, and 70. The voltage multiplier 66 for the photocathode 20 includes two multipliers of differing voltage level, and indicated with the numerals 66a and 66b. A tri-stable switching network 72 switches controllably between alternative positions either conducting the photocathode 20 to voltage multiplier 66a, to voltage multiplier 66b, or to an open circuit position, all via the conductive connection 72a. In other words, the switching network 72 alternatingly connects the photocathode 20 of the tube 14 to a voltage source at about −800 volts, or to a source at about +30 volts relative to the front face of the microchannel plate, as will be further seen. The open circuit interval of time employed in the present embodiment between connections of the photocathode 20 to the two voltage sources 66a and 66b is used for purposes of energy efficiency, and is optional. A duty cycle control 74 controls the switching position of the switching network 72, and receives as inputs a square wave gating trigger signal from an oscillator 76, and a control signal via a conductor 78 from an ABC/BSP control circuit 80. Once again, the user of a square wave duty cycle trigger signal is optional. Other forms of duty cycle trigger waves can be employed.

Power supply to the MCP 22 (that is, to the conductive layers or metallizations 28a and 30a) is effected from the voltage multiplier 68 via connections 68a and 68b. Interposed in connection 68a is a series element 82, which in effect is a variable resistor. A high-voltage MOSFET may be used for element 82, and the resistance of this element is controlled over a connection 82a by a regulator circuit 84. Regulator circuit 84 receives a feed back control signal from a summing junction 86, which receives an input from conductor 88 via a level-adjusting resistor 90, and also receives an input via conductor 92 from the ABC/BSP control circuit 80. Conductor 88 also provides a reference voltage signal of the voltage level applied to the input face 28 (i.e., at metallization 28a) of the MCP 22 into the voltage multiplier circuit 66.

The voltage multiplier 70 has connection to the screen 26 via a connection 70a, and provides a feed back of screen current level into ABC/BSP control circuit via conductor 94. Energy flow in the circuit 62 is provided by an oscillator 96 and coupled transformer 98, with output windings 98a providing energy input to voltage multipliers 66 and 70, and a conductor 100 providing energy to voltage multiplier 68. The oscillator 96 receives a control feed back via a regulator 102 and a feed back circuit 104, having an input from a feedback winding 98b of transformer 98.

Having considered the structure of the circuit 66, attention may now be given to its operation, and the cooperation of this circuit operation with the operation of the image intensifier tube 14 to provide imaging. It will be noted that this imaging of a scene for a user of the device 10 may take place at night in conditions of viewing a scene under dark-field conditions, or during the day with the scene illuminated by sun light. It will be noted also that the voltage level produced by voltage multiplier 66a is a substantially constant voltage level. Preferably, this voltage is about negative 800 volts. On the other hand, the voltage multiplier section 66b provides a substantially constant voltage level referenced to the voltage provided by voltage multiplier 68 to the front face 28a of the MCP 22. Preferably, this voltage level is positive 30 volts relative to the front face 28 of the MCP 22.

By operation of the switching network 72, the photocathode 20 is controllably and cyclically changed between connection to the constant voltage source 66a, to an open circuit (i.e., voltage off), and to the lower voltage provided by source 66b (simulating darkness for the photocathode). This gating function is carried on at a constant frequency (preferably at about 50 Hz), with a constant cycle interval, while varying the duty cycle of the applied constant voltage from voltage multiplier 66a as a function of current level sensed at screen 26 (i.e., by feed back over conductor 94). The frequency of the duty cycle for the photocathode is sufficiently fast that no flicker is perceived in the viewed image.

Viewing FIG. 4, it is seen that over a first selected range of screen current the duty cycle of the applied constant voltage from multiplier 66a to the photocathode 20 is fixed at 100%. However, at screen current levels above a selected level of screen current, the duty cycle progressively ramps down substantially linearly to a low level of essentially 10–4% as a function of increasing screen current. For screen current levels above that at which the duty cycle for gating of the constant voltage from source 66a to the photocathode 20 drops to its low level, an additional function of BSP is provided by decreasing the voltage applied to the MCP 22. As FIG. 5 shows, for all screen current levels lower than those necessary to initiate this BSP protection function, the voltage applied across the MCP 22 is a constant. The reduction of voltage level applied across the MCP 22 for BSP is effected by action of the series element 82 increasing its resistance under control of MCP regulator 84.

As noted this regulator 84 receives a summed input from the voltage multipliers 66, and from the ABC/BSP control circuit 80, which is responsive to screen current level sensed by conductor 94. An understanding of the voltage level experienced as a function of time within duty cycle intervals at the photocathode 20 can be obtained by noting that a virtual capacitor exists between the photocathode 20 and the front face 28 of MCP 22. This capacitor exists electrically, but not as a conventional capacitor structure. On FIG. 3, this virtual capacitor is diagrammatically indicated, and indicated by the arrowed reference character "C". When the duty cycle for the application of the constant voltage supplied by voltage multiplier 66a is 100%, or close to this level, then following the opening of the circuit through switching network 72, the voltage across the virtual capacitor "C" decays over a time interval at a natural open-circuit, capacitor-discharge rate. This voltage decay is actually a very small voltage because of the short time interval (i.e., 1/50th second at a 50 Hz frequency for the gating operation of switching network 72).

Next in each duty cycle, the network 72 conducts the photocathode to voltage multiplier 66b, which effectively replicates darkness for the photocathode 20 by dropping the voltage on the photocathode to +30 volts relative to the face 28 of MCP 22. As noted above, this voltage cutoff is provided by having voltage multiplier 66b provide a voltage which is about 30 volts positive with respect to the voltage provided at coating 28a on the front face of the MCP 22 by voltage multiplier 68.

In essence, when the photocathode 20 operates, it always operates at the high constant voltage provided by voltage multiplier 66a. When the photocathode 20 is not operating, it is switched to a voltage which replicates a dark field for the photocathode (i.e., the +30 volts from voltage multiplier 66b). The photocathode 20 operated by the circuit 62 of the present invention is switched between operation at its designed voltage level and dark-field condition at a duty cycle which varies dependent upon the light intensity of the scene being viewed, as indicated by current flow at the screen 26.

This function is carried out in accord with the duty cycle function in order to provide ABC. The result of this ABC operation is a substantially constant brightness for the image presented to a user of the night vision device 10 is achieved, until the scene becomes too dim to produce an image even with image intensification technology. In other words, over the entire operating range of the image intensifier tube 14, its operation by circuit 62 provides substantially constant brightness for the image presented to the user of the device.

Further considering the operation of circuit 62 to provide an image for the user of the device 10, is seen that once the duty cycle is reduced to its low level of 10–4%, in the event that screen current increases further, then as a function of increasing screen current the voltage across the MCP 22 is reduced slightly, viewing now FIG. 5. This reduction of MCP voltage has the effect of providing BSP. That is, after the ABC function has reached its lowest level of duty cycle to the photocathode 20, if light level of the viewed scene continues to increase (indicative of a bright source in the scene), then the duty cycle maintains its low 10–4% level, while the bright-source protection function explained above is effected.

LASER RANGE FINDING

Further considering now FIGS. 1 and 3, the operation of the device and circuit 62 to provide a laser range finder function will be explained. The device 10 further includes a laser 106 capable of projecting a high-energy, short-duration laser light pulse 106a into the scene being viewed by the operator of the night vision and laser range finder device 10. This pulse of laser light is diagrammatically illustrated on FIG. 3 with the arrow 106a, and by the user of appropriate reflective surfaces and lenses (not shown) may be arranged to project outwardly through the objective lens 12 toward the scene being viewed. It will be understood that the laser light 106 need not project outwardly through lens 12. For example, a separate set of projection lenses can be provided for laser 106 in order to project the laser light pulse 106a. As is explained in this disclosure, in the event that the laser pulse is not projected from lens 12, then the hard turn off time interval of operation for image tube 14 in a laser range finding operation need not be employed. In this case, laser range finding operations can be conducted using an image intensifier tube as a sensor for the reflected laser light otherwise as disclosed herein.

Laser 106 is powered by a laser driver circuit, indicated with numeral 108. A laser range finder (LRF) control logic circuit 110 (the operation of which will be further explained below) provides a control input to the driver circuit 108 to effect operation of the laser 106, and also provides a control input to the oscillator 96 via a conductor 112.

Conductor 112 at a branch 112a thereof also provides a control input to an actuator 114, which in response to this control input moves a spatial filter 116 (to be further described below) into and out of the optical pathway between lens 12 and the image intensifier tube 14, as is indicated by dashed lines on FIG. 1. The spatial filter 116 is essentially a shutter or centrally apertured plate, which blocks returning laser light from portions of the viewed scene other than in the central area where the object of interest is located. During a LRF operation, the actuator 114 pauses the spatial filter 116 in the optical pathway of the device 10. That is, this is a controlled momentary pause between the inward and outward movements of these filters. During the pause of the filter(s) in the optical pathway, laser light is projected to an object in the viewed field, and reflected laser light returned from the object for a LRF operation is received at the device 10.

The LRF control logic circuit 110 also has a control output 118a to a gating control circuit 118. This circuit has connection to switching network 72, as is illustrated. An operator-input command switch 120 is provided by which the operator of the device 10 can indicate a command that a LRF operation be carried out be the device 10. The remainder of the elements of the device 10 will be described in connection with a LRF operation.

A LASER RANGE FINDING OPERATION

Considering FIG. 3 still, when the operator of the device 10 wishes to obtain range information to an object in the viewed field, the operator centers the object in the viewed scene, possibly by using a reticule provided by the device 10, and makes a LRF input command at 120. This input command may be effected by use of a simple push-button switch, for example. In response to this input command, the LRF control logic circuit 120 effects the following sequential activities in order:

First, the oscillator 96 is shut down by a command over conductor 112. This command also has the effect of causing actuator 114 to move the selected spatial filter 116a/b into the optical pathway. The shutdown command for the oscillator 96 also is used to cause the voltage multiplier 68 to drive the MCP 22 to a high-gain voltage level. Preferably, this high-gain voltage level is a differential voltage of about 1200 volts across the MCP 22.

Second, the LRF control logic circuit commands the switching network 72 to perform a timed switching operation (as is further described below), first switching photocathode 20 to the voltage from multiplier 66b (i.e., to +30 volts relative to the front face of MCP 22—effecting a hard turn off for the photocathode of the tube 14); and then later in timed relation connecting this photocathode to source 66a.

Third, after a time interval of about 3 ms (which is required to allow the oscillator 76 to stop its operation), the laser light pulse is fired. The photocathode 20 is then effectively switched to the voltage source of multiplier 66a (i.e., to about −800 volts). Actually, the photocathode 20 is switched to voltage source 66a in timed relation before the laser light pulse is fired. The photocathode needs to settle from about 200 $\mu$s before the laser is fired. In order to provide a non-responsiveness of the device 10 to the back scatter of laser light which may occur in the optics, amplifier 132 is causes to have a time-dependent gain. One way in which this time-dependent gain may be implemented is to provide a high threshold value which the electron pulse from image intensifier tube 50 must exceed before the signal is provided to stop timer 126. This threshold value would be high immediately after laser pulse 22 is fired, and would decrease as a function of time after the pulse is fired. Another alternative is to have a step-function change in the threshold value at a certain time after the laser light pulse is fired. In this way, the timer 126 will respond to the electron pulse resulting from reflection 24, rather than to the back scatter of laser light from surfaces of the lenses in the device 10.

Fourth, shortly after the time the LRF control logic commands the laser 102 to fire a pulse of laser light into the scene which was being viewed by the user of the device 10, this pulse will actually be fired. A time-zero ($t_0$) detector 122 detects the moment of actual firing of this laser light pulse, and provides a signal on conductor 124 which starts a high-speed digital timer 126. Prior to the moment of firing of this laser light pulse, the photocathode is connected to voltage source 66b (i.e., to the +30 volts relative source) for a purpose to be further explained below.

Fifth, when the laser light reflects from an object in the scene, returning laser light passes through a central aperture 116a or 116b of spatial filter 116, so that reflections of laser light from other objects in the scene are blocked (i.e., having the effect of increasing the signal to noise ratio of the returning light pulse). The optical filter 140 also has a beneficial effect on signal-to-noise level during day time LRF operations, because it removes some of the background light from the day-time scene which is present at frequencies close to that of the laser 106. The returned laser light (still in the form of a pulse) passing to image intensifier tube 14 causes a pulse of photoelectrons to be released by photocathode 20, as is graphically depicted on FIG. 1 and indicated with the character "P1". The pulse P1 of photoelectrons passes to MCP 22, and causes a corresponding pulse of secondary-emission electrons "P2" (produced under "high gain" conditions for the microchannel plate 22), which electrons pass to the output electrode assembly 24. A corresponding pulse in the current from screen 26 is detected at conductor 128 having interposed capacitor 130, and is passed to a high-gain amplifier 132. Amplifier 132 provides a timer-stop command over conductor 134 to high-speed timer 126.

Next, spatial filter 116 is withdrawn from the optical pathway, the oscillator 76 is restarted, and the gating operation of the switching network 72 is resumed (if it was operating before the LRF operation as a result of the light conditions in the field being viewed. In other words, the explanation below concerning daytime operations of the device 10 may be consulted at this time. The image of the scene being viewed is thus restored for the user of the device 10. During the LRF operation, the operator of the device 10 may detect a flicker in the viewed image along with a very brief flash of light (i.e., from the pulse of electrons P2 impacting the screen 26). The LRF operation takes only about 5 ms to complete (although the physical movements of filters 116a/b will be somewhat slower than this) so the user's view of the scene in not significantly interrupted.

The time interval between the to signal and the timer-stop command is provided by the timer 126 to a range calculator 136, which then supplies an output (indicated with arrowed numeral 138) of range information to the object for the operator of the device 10. It will be noted that prior to the firing of the laser light pulse, the photocathode is connected to voltage source 66b, which is about +30 volts positive relative to the face 28 of microchannel plate 22. This positive voltage level on the photocathode 20 has the effect of a "hard turn off" on the photocathode, preparing it to be somewhat insensitive to photons of laser light which may be back scattered from surfaces of the lenses between laser 106 and the projection outwardly of the beam 106a. That is, laser light may be reflected within the device 10 during the firing of this laser light pulse, but the image intensifier tube is momentarily somewhat blinded to this light after the hard turn off effected on photocathode 20, even though voltage source 66a is connected before the actual moment of firing of this laser light pulse in order to provide charge settling on the photocathode.

DAYTIME IMAGING AND LRF OPERATION

It will be noted that for daytime operation of the device 10, the BSP function is disabled, and the ABC function of the device 10 allows imaging to be accomplished in daylight. Accordingly, the ABC function may be operating the photocathode at less than 100% duty cycle. Under these conditions, a LRF operation additionally momentarily interrupts the duty cycle gating operation carried out by switching network 72, and effects the switching of the photocathode 20 to the voltages provided by sources 66b and 66a (in sequence as described above) in order to effect the hard turn off of the photocathode during laser firing, and then to allow the photocathode to be highly responsive to photons of reflected laser light in order to provide the LRF pulses P1, as described above.

Further, it should be noted that spatial filter 116 can be provided with apertures 116a/b of differing sizes. That is, this filter may be provided with a filter blade having an aperture of about 18 mm (for example) for use in night time LRF operations, and with an alternative filter blade having an aperture of about 2 mm for use in day time LRF operations. Also, selection of one or the other of these spatial filters may assist in LRF operations at night or in day time when the user of the device is ranging on objects having high or low reflectivity. A selector 116d allows the user of the device to select which one of the spatial filters 116a or 116b is moved into the optical pathway during LRF operations by the actuator 114.

Further, an optional optical filter 140 may be provided, which functions as a band-pass notch filter to preferentially pass the wavelength of the laser light from laser 106, thus further improving the signal to noise ratio during LRF operations in day time. During day time observation and LRF uses of the device 10, the optical filter 140 is preferably always used. An actuator knob 140a is provided on the device 10 to manually move the filter 140 into and out of the optical pathway leading to the image intensifier tube 14, and is marked as indicated for day and night operations of the LRF function.

Those skilled in the art will appreciate that the embodiment of the present invention depicted and described herein and above is not exhaustive of the invention. Those skilled in the art will further appreciate that the present invention may be embodied in other specific forms without departing from the spirit or central attributes of the invention. For example, it is clear from the description above that a viewing device using an image intensifier tube may also perform laser range finding functions using the image intensifier tube as a sensor for the reflected laser light pulse without using the "hard turn off" technique described herein. Such a device would project the laser light pulse for laser range finding using a separate projection optical system. The image intensifier tube would still be used as a sensor by insuring that the photo cathode and microchannel plate of the tube are in high gain conditions during the interval in which the laser light pulse returns. In this way, the electrical response of the image intensifier tube can be used to initiate the "timer stop" command necessary for measuring the transit time for the laser light pulse to and from the scene and object of to which a range is desired. Because the foregoing description of the present invention discloses only an exemplary embodiment, it is to be understood that other variations are recognized as being within the scope of the present invention. Accordingly, the present invention is not limited to the particular embodiment which has been depicted and described in detail herein. Rather, reference should be made to the appended claims to define the scope and content of the present invention.

What is claimed is:

1. A method of operating a night vision device in order to provide both a visible image using ambient light and range finding using a projected pulse of laser light, said method comprising steps of:

providing the device with an image intensifier tube, and directing ambient light from a scene to the image intensifier tube;

causing the image intensifier tube to responsively provide a visible image of the scene;

projecting a pulse of laser light into the scene, and causing a portion of this pulse of laser light to be reflected from an object in the scene to the image intensifier tube;

in response to the reflected portion of the pulse of light causing said image intensifier tube to provide an electrical output; and measuring a time interval between projection of said pulse of light and said electrical output indicative of a range from the device to the object.

2. The method of claim 1 further including the step of determining the range between the device and the object using the speed of light as a measuring standard.

3. The method of claim 2 wherein measuring the time interval includes steps of starting a timer upon projection of said pulse of light, and stopping said timer in response to said electrical output from said image intensifier tube.

4. The method of claim 2 further including the step of presenting the range in numerical form to a user of the device.

5. A method of using an image intensifier tube to both provide an image of a scene using ambient light and to measure a range to an object, said method comprising steps of:

utilizing ambient light to cause the image intensifier tube to provide a visible image of the scene, projecting a pulse of light to the object and causing a portion of this pulse of light to be reflected from the object to the image intensifier tube;

utilizing said image intensifier tube to provide an electrical output in response to receipt of the reflected light;

measuring a time interval from projection of said pulse of light until provision of said electrical output by said image intensifier tube; and from said time interval determining the range to the object using the speed of light as a measuring standard.

6. The method of claim 5 further including the steps of preparing said image intensifier tube to provide the electrical output by applying a determined high-gain voltage across a microchannel plate of the image intensifier tube preparatory to provision of said electrical output.

7. The method of claim 5 further including the steps of preparing said image intensifier tube to provide the electrical output by first applying a relative positive voltage to a photocathode of the image intensifier tube during projection of said pulse of light, and thereafter applying a constant negative voltage to the photocathode during receipt of reflected light at the image intensifier tube.

8. The method of claim 5 further including the steps of preparing said image intensifier tube to receive reflected light by interposing a spatial filter having a central aperture therein between said object and said image intensifier tube.

9. The method of claim 5 further including the steps of using light of a particular wavelength band to form said light pulse and preparing said image intensifier tube to receive reflected light by interposing between said object and said image intensifier tube an optical band-pass notch filter substantially allowing passage only of light of substantially the same wavelength as the projected light pulse while significantly blocking light of other wavelengths.

10. A method of determining a range from a location to an object comprising steps of:

projecting a pulse of light from the location to the object via an objective lens and causing a portion of this pulse of light to be reflected from the object back to the location and through the objective lens;

providing an image intensifier tube at the location;

utilizing said image intensifier tube to provide a visible image from light received via said objective lens and to provide an electrical output in response to receipt of the reflected light pulse portion;

measuring a time interval from projection of said pulse of light until provision of said electrical output by said image intensifier tube; and from said time interval determining the range from the location to the object using the speed of light as a measuring standard.

11. A laser range finder and night vision apparatus, said apparatus comprising:

a laser light source for projecting a pulse of laser light from the apparatus toward an object the range to which is to be determined, a portion of the projected laser light illuminating the object and being reflected back toward the apparatus;

an image intensifier tube receiving reflected laser light from the object and responsively providing an electrical output; said image intensifier tube also providing a visible image of the object and a scene in which said object is located;

a timer device for measuring a time interval from projection of said pulse of laser light until provision of said electrical output by said image intensifier tube; and a calculator determining the range from the apparatus to the object using said time interval and the speed of light as a measuring standard.

12. The laser range finder of claim 11 further including: an objective lens receiving light from a scene and directing this light to said image intensifier tube, said image intensifier tube responsively providing a visible image of the scene, and an eyepiece lens providing said visible image to a user of the apparatus.

13. A night vision device comprising:

an objective lens receiving ambient light from a scene;

an image intensifier tube receiving ambient light from the scene via the objective lens and responsively providing a visible image of the scene, an eyepiece lens providing the visible image to a user of the night vision device;

a laser projecting a pulse of laser light into the scene, a portion of this pulse of laser light reflecting from an object in the scene to provide a reflected laser light pulse;

circuit means causing said image intensifier tube to provide an electrical output in response to receipt of said reflected laser light pulse;

a timer measuring an interval from the time of projection of said pulse of laser light until the time of provision of said electrical output by said image intensifier tube;

a calculator determining range information indicative of the distance from the night vision device to the object using said time interval and the speed of light as a measuring standard; and means for providing said range information to a user of the device.

14. An integrated night vision device and laser range finder including an image intensifier tube and providing a visible image of a scene and range to an object in the scene, said device comprising:

an image tube power supply section providing respective operating voltage levels for each of: a photocathode, respective first and a second facial electrodes of a microchannel plate, and an output electrode of the image intensifier tube;

an operator-input device for laser range finding, said operator-input device receiving an operator's command to perform a laser range finding (LRF) operation;

a laser providing a laser light pulse projecting into the scene to illuminate the object;

a time-zero detector responsive to projection of said laser light pulse to provide a time-zero output signal;

an interval timer starting in response to the time-zero output signal;

a laser range finding control logic unit for providing operating control commands to said image tube power supply section to in response to a LRF command momentarily suspend imaging operation, and charging the microchannel plate of said image intensifier tube to a high-gain voltage differential between said first and second facial electrodes;

an electrical connection to said output electrode to detect an impulse current indicative of reflected laser light returning to said image intensifier tube from an object in the scene; and an output device responsive to detection of said impulse current to provide a time-stop command to said interval timer thus measuring a time interval; and a calculator using said time interval and the speed of light as a measuring standard to determine range to the object.

15. The integrated night vision device and laser range finder of claim 14 further including an actuator moving a filter into an optical pathway leading from the scene to the image intensifier tube in response to a LRF command.

16. The integrated night vision device and laser range finder of claim 15 wherein said filter includes a spatial filter.

17. The integrated night vision device and laser range finder of claim 15 further including an optical spectral band-pass notch filter movable into said optical pathway.

18. A combined night vision and laser range finder device, said device comprising:

an objective lens through which light from a scene being viewed is received, said objective lens directing light from the scene to an image intensifier tube providing a visible image of the scene;

a laser light source projecting a pulse of laser light outwardly through said objective lens in to the scene being viewed;

said image intensifier tube receiving reflected laser light from the object and responsively providing an electrical output; and means for measuring a time interval from projection of said pulse of laser light until provision of said electrical output by said image intensifier tube; and for calculating the range from the device to the object using the speed of light as a measuring standard.

19. A method of using an image intensifier tube to alternatingly provide a visible image and an electrical output pulse signal which signal is indicative of a time of receipt of a pulse of reflected laser light, said visible image having a brightness level, said method comprising steps of:

during provision of a visible image with said image intensifier tube, controlling the brightness of said image by control of one or more of the voltage levels applied to a photocathode of the image intensifier tube, and as a voltage differential across a microchannel plate of the image intensifier tube;

preparing the image intensifier tube to alternatively provide said electrical output pulse signal by charging said photocathode to a selected high-response voltage level, and also providing a certain high-gain voltage differential across said microchannel plate;

utilizing the image intensifier tube so prepared to produce said electrical output pulse signal from an output electrode of the image intensifier tube; and subsequently to production of said electrical output pulse signal, returning said voltage levels substantially to their values existing before preparation of the image intensifier tube to provide the electrical output pulse signal.

20. The method of claim 19 further including the step of effecting a hard turn off of the photocathode of the image intensifier tube prior to charging of said photocathode to said selected high-response voltage level.

21. The method of claim 20 wherein said step of effecting a hard turn off of said photocathode includes the step of conducting said photocathode to a voltage source having a positive value relative to a first face of the microchannel plate.

22. The method of claim 21 wherein said positive voltage level is about +30 volts relative to the first face of the microchannel plate.

23. The method of claim 19 wherein said selected high-gain voltage level for said photocathode is about −800 volts.

* * * * *